United States Patent [19]

Hardiman, Jr.

[11] Patent Number: 4,513,773
[45] Date of Patent: Apr. 30, 1985

[54] VALVE GUARD

[76] Inventor: Brendon J. Hardiman, Jr., 258 Mower St., Worcester, Mass. 01602

[21] Appl. No.: 607,601

[22] Filed: May 7, 1984

[51] Int. Cl.³ ............................................. F16K 35/10
[52] U.S. Cl. .................................. 137/382; 137/383; 220/85 P; 70/178
[58] Field of Search ............... 251/90; 137/382, 383; 220/85 P; 70/178

[56] References Cited

U.S. PATENT DOCUMENTS

| | | | |
|---|---|---|---|
| 1,947,081 | 2/1934 | Grady et al. | 70/178 |
| 2,838,064 | 6/1958 | Schieberl | 137/382 |
| 4,030,628 | 6/1977 | Hippert, Jr. | 220/85 P |
| 4,380,247 | 4/1983 | Douglas | 137/382 |

Primary Examiner—Samuel Scott
Assistant Examiner—Allen J. Flanigan
Attorney, Agent, or Firm—Blodgett & Blodgett

[57] ABSTRACT

A valve guard for a gas tank having a valve at the top of the tank and an apertured flange at the top of the tank which is spaced from the valve. The valve guard comprises a top wall which is adapted to overlie the valve handle and extend over the top of the flange to a point outside of the flange. The valve guard also has a plurality of vertical walls and a bottom wall which has a slot through which the valve stem extends so that the bottom wall is positioned between the valve handle and the valve casing. The forward end of the bottom wall extends through an opening in the flange so that it underlies the forwardly extending portion of the top wall and has an aperture which is aligned with a similar aperture in the top wall for receiving the shackle of a lock.

8 Claims, 6 Drawing Figures

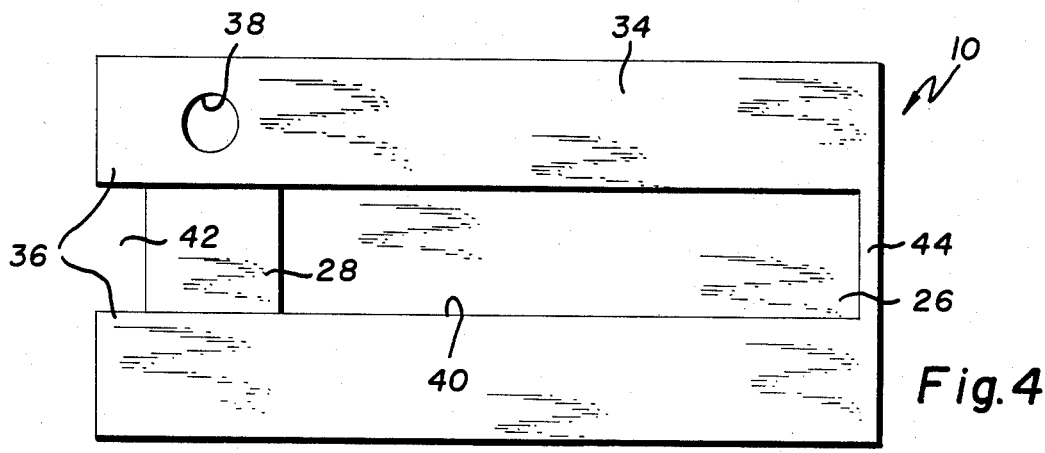
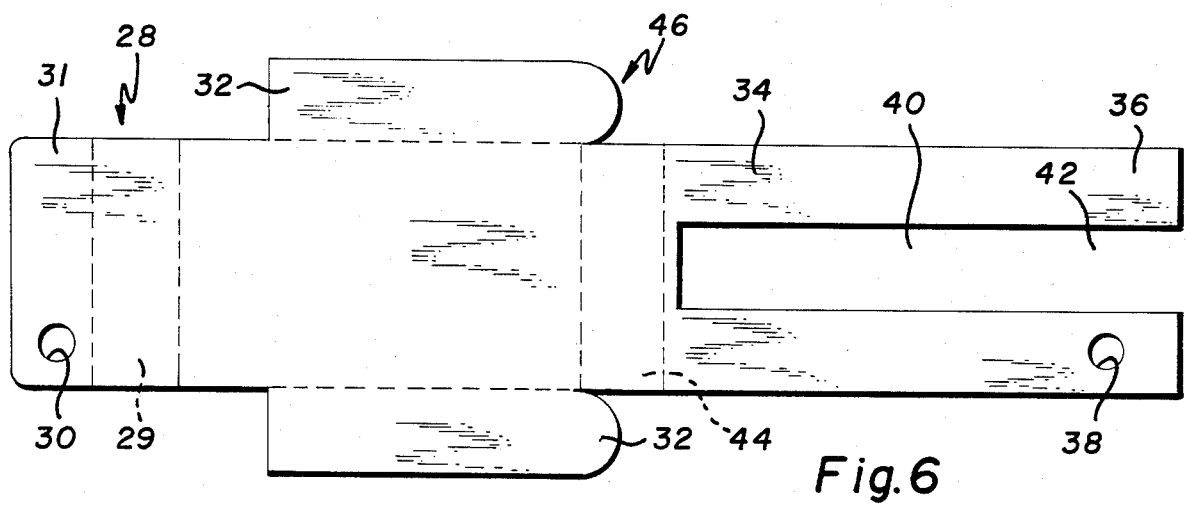
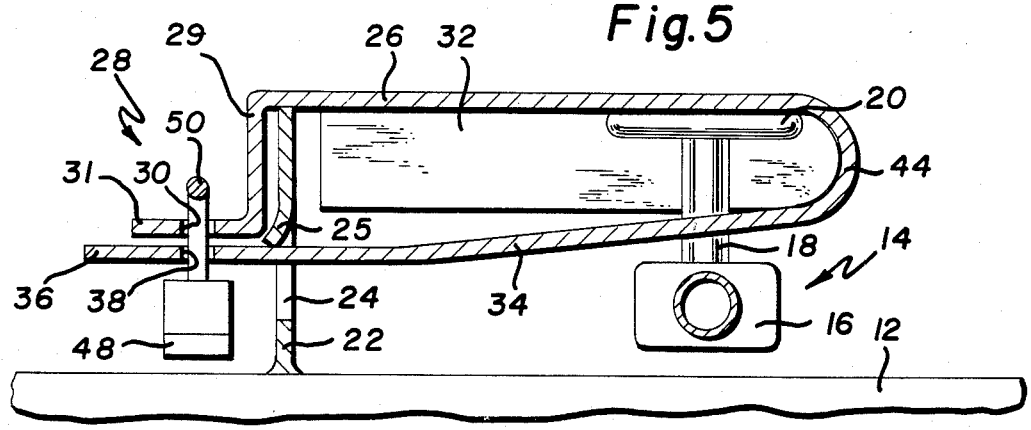

VALVE GUARD

BACKGROUND OF THE INVENTION

The present invention is generally directed to a guard for a shut-off valve. The invention is more specifically directed to a guard for a shut-off valve on a gas tank of propane or other combustible gas of the type commonly used on mobile homes, campers, and outdoor grills. This type of gas tank has a shut-off valve at the top of the tank which includes a casing, a valve stem which extends vertically from the casing and a handle at the top of the stem. The valve is protected b a vertical flange which partially surrounds the valve and which has an opening that provides a handy carrying handle for the tank.

Since propane gas tanks are normally located outside of the mobile home or camper, they are subject to vandalism. When gas is not being utilized, it is customary to shut the valve. Unauthorized opening of the valve can create a danger to life and property in addition to loss of gas. Also, unauthorized closing of the valve while gas is being utilized causes considerable aggravation to the user.

Valve guards have been developed in the past for different types of valves. For example, one type of valve guard comprises an openable shroud which is adapted to envelope a valve which is located on a supply pipe. The shroud is maintained in a closed position by means of a padlock. Another type of valve guard includes two parts. One part is fastened to the valve housing and the other part is then secured to the first part by means of a padlock in such a way that the fastener means are unaccessable from the outside. The prior art guards are either unsuitable to the valve of a propane gas tank or are unduly complex, difficult to utilize or otherwise not completely satisfactory. These and difficulties experienced with the prior art valve guards have been obviated by the present invention.

It is, therefore, an outstanding object of the invention to provide a valve guard which is particularly adapted to a gas tank which has an apertured flange located adjacent the valve at the top of the tank.

Another object of the invention is the provision of a valve guard which can be formed by bending the various elements of the guard from a single planar stamping.

A further object of the present invention is the provision of a valve guard which can be easily applied and removed from the valve.

It is another object of the instant invention to provide a valve guard which is simple in construction, which is inexpensive to manufacture, and which is capable of a long life of useful service.

With these and other objects in view, as will be apparent to those skilled in the art, the invention resides in the combination of parts set forth in the specification and covered by the claims appended hereto.

SUMMARY OF THE INVENTION

In general, the invention consists of a value guard for a gas tank having a valve at the top of the tank and an apertured vertical flange which is spaced from the valve. The valve guard comprises a top wall, a plurality of vertical walls, and a bottom wall. The top wall is adapted to overlie the valve handle and to extend over and beyond the flange. The bottom wall has a slot that enables the valve guard to be applied to the valve so that the bottom wall lies between the handle and the casing of the valve with the valve stem extending through the slot. The bottom wall extends through the aperture in the flange so that it underlies the top wall and includes an aperture which is vertically aligned with a similar aperture in the top wall for receiving the shackle of a padlock. More specifically, all portions of the valve guard are integral and formed from resilient sheet metal.

BRIEF DESCRIPTION OF THE DRAWINGS

The character of the invention, however, may be best understood by reference to one of its structural forms, as illustated by the accompanying drawings, in which:

FIG. 4 is a bottom plan view of the valve guard, FIG. 5 is a vertical cross-sectional view of the valve guard taken on the line V—V of FIG. 1, and FIG. 6 is a plan view of a sheet metal stamping from which the valve guard of the present invention is made.

DESCRIPTION OF THE PREFERRED EMBODIMENT

Figure 1:
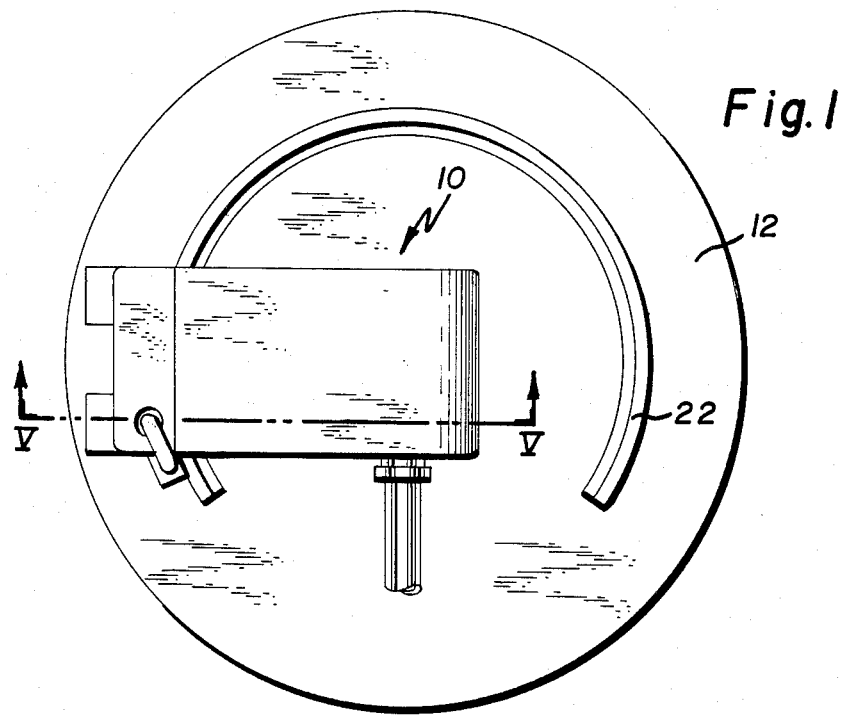
FIG. 1 is a plan view of the valve guard of the present invention and shown applied to the valve of a gas tank.
Figure 2:
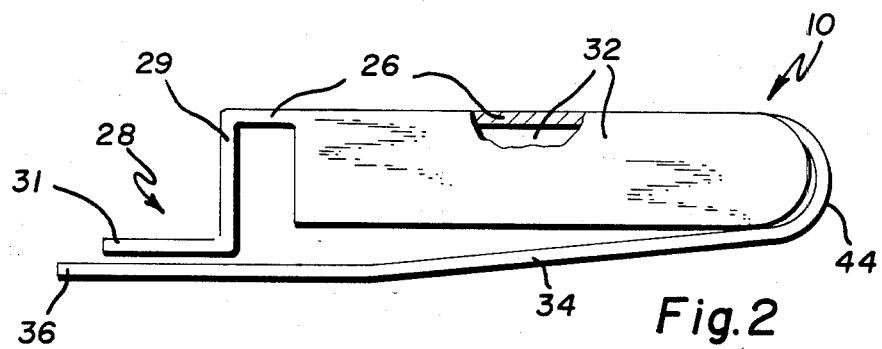
FIG. 2 is a side elevational view of the valve guard.
Figure 3:
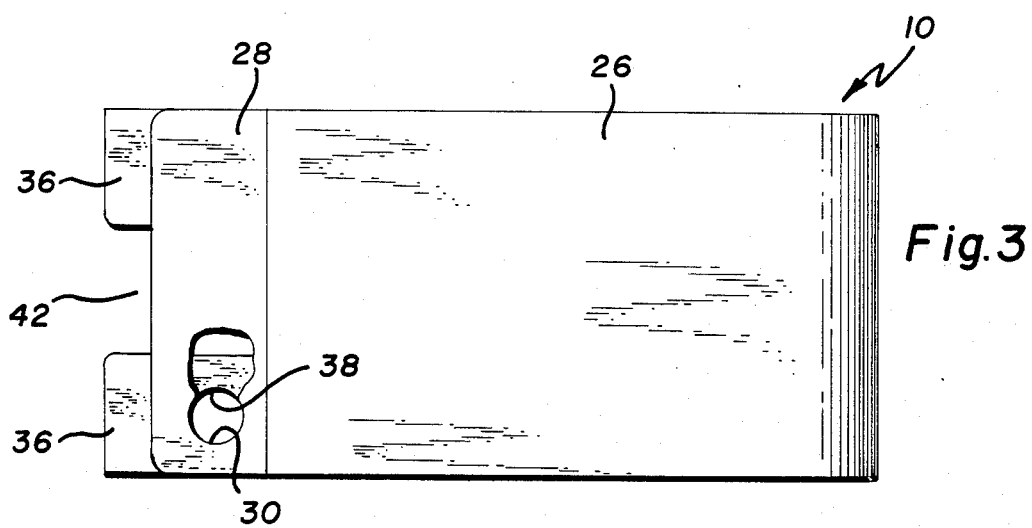
FIG. 3 is a top plan view of the valve guard.

Referring first to FIGS. 1 and 2, the valve guard of the present invention is generally indicated by the reference numeral 10 and is shown applied to a gas tank 12 which has a shut-off valve generally indicated by the reference numeral 14 at the top of the tank. The valve 14 comprises a valve casing 16, a valve stem 18 extending upwardly from the casing 16, and a handle 20 located at the top of the stem 18. A vertical flange 22 is also located at the top of the tank. The flange 22 is spaced from the valve 14, is generally circular in shape, and almost completely surrounds the valve, as shown in FIG. 1. The flange 22 is provided with an aperture 24 which normally extends along the length of the flange and provides a convenient hand hold for carrying the tank.

Referring particularly to FIGS. 1–4, the valve guard 10 of the present invention comprises a top wall 26 which has a forwardly extending upper lip, generally indicated by the reference numeral 28, and a pair of vertical side walls 32 which extend downwardly from the top wall 26. The upper lip 28 consists of a front wall portion 29 which defines a gap 33 between the portion 29 and the side walls 32, and a horizontal portion 31 which contains a first aperture 30. The valve guard 10 also includes a bottom wall 34 which is attached to the top wall 26 by means of a curved back wall portion 44. The bottom wall 34 has a forwardly extending lower lip 36 which underlies the upper lip 28 and contains a second aperture 38 which is vertically aligned with the first aperture 30. The bottom wall 34 has an elongated slot 40 which extends from the back wall 44 to a front opening 42. All of the elements of the valve guard are integral and made of a resilient material. The resiliency of the material plus the curved shape of the back wall 44 enables the bottom wall 34 to be moved away from the top wall a considerable distance without permanent deformation. Preferably, the valve guard of the present invention is made from a material which has a certain degree of resilient elasticity and yet is capable of deformation so that it can be formed from a single stamping, such as that shown in FIG. 6. Referring to FIG. 6, the guard 10 is formed by first providing a stamping generally indicated by the reference numeral 46 which includes all of the elements of the guard. The stamping is then bent along the dotted lines in appropriate jigs or fixtures into its final shape as shown in FIG. 2.

The operation and advantages of the present invention may now be readily understood in view of the above description. The valve guard 10 is applied to a valve such as 14 by first separating the upper and lower lips 28 and 36, respectively, positioning the upper lip 28 above the handle 20 and passing the lower lip 36 below the handle so that the stem 18 is located within the slot 40. The lower lip 36 extends beyond the upper lip 28. This enables the extending portion of the lower lip to be positioned beneath the handle 20. By pulling the guard upwardly, the upper and lower lips can be forced apart so that the handle 20 can pass between the lips.

After the valve guard 10 has been applied to the valve 14, it is moved toward the flange 22 with the stem 18 riding along slot 40. When the extending portion of the lower lip 36 reaches the opening 24, it is positioned against the upper edge 25 of the opening. With the extending portion of the lip 36 firmly anchored against the upper edge 25, the valve guard 10 is pulled upwardly so that the upper and lower lips 28 and 36, respectively, are separated sufficiently to allow the upper lip 28 to clear the top of the flange 22. As soon as the front wall portion 29 is positioned in front of the flange 22, tension on the bottom wall 34 is relaxed and the upper lip 28 is allowed to descend down to the lower lip 36 to assume the position shown in FIG. 5. The valve guard 10 is secured in this enclosing position by means of a padlock 48. The shackle 50 of the padlock is inserted through the apertures 30 and 38 and then secured into a locking position within the body of the padlock. Since the handle 20 is completely enclosed by the valve guard, unauthorized opening and closing of the valve is prevented. The valve guard can be removed from the valve only by first removing the padlock 48 by means of a corresponding key and then lifting up on the top wall 26 until it clears the top of the flange 22. Thereafter, the valve guard 26 is moved toward the handle 20 whereupon the upper wall 20 is again pulled upwardly with the bottom wall 34 anchored beneath the handle 20 so that the upper lip clears the top of the handle 20.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Valve guard for a gas tank having a valve at the top of the tank which includes a casing, a valve stem which extends vertically from the casing and a valve handle at the top of the stem, the gas tank also having a vertical flange which is spaced from the valve and which has an opening that is horizontally aligned with the valve, said valve guard comprising:
   (a) a top wall adapted to overlie said valve handle and said vertical flange and having a forwardly extending upper lip which is adapted to extend over and beyond said flange, said upper lip portion having a first aperture,
   (b) a plurality of vertical walls extending downwardly from said top wall, and
   (c) a bottom wall operatively connected to said top wall and having a slot that enables the valve guard to be applied to the valve so that the bottom wall lies between the handle and the casing of the valve and the stem extends through said slot, the width of said slot being greater than the width of said stem and less then the width of said handle, said bottom wall having a forwardly extending lower lip which is adapted to extend through said flange opening and underlies said upper lip, said lower lip having a second aperture which is vertically aligned with said upper aperture for receiving the shackle of a lock.

2. Valve guard as recited in claim 1, wherein said upper lip comprises a vertical front wall portion which is adapted to lie along the outside of said vertical flange and a horizontal portion which contains said first aperture.

3. Valve guard as recited in claim 2, wherein said vertical walls includes a pair of opposite side walls which are spaced from said front wall portion.

4. Valve guard as recited in claim 1, wherein said bottom wall is operatively connected to the top wall along the back of the valve guard and is movable from a closed position in which said upper and lower lips are in close proximity to an open position in which said lips are substantially spaced.

5. Valve guard as recited in claim 4, wherein said bottom and top walls are integral and formed of a resilient material, said bottom wall normally occupying said closed position and resiliently movable to said open position.

6. Valve guard as recited in claim 5, wherein the top and bottom walls are connected by an integral curved back wall.

7. Valve guard as recited in claim 1, wherein said slot extends forwardly to an open end in said lower lip.

8. Valve guard as recited in claim 1, wherein all portions of said valve guards are integral and formed from resilient sheet metal.

* * * * *